(12) United States Patent
Muramatsu et al.

(10) Patent No.: US 12,337,620 B2
(45) Date of Patent: Jun. 24, 2025

(54) AIRCRAFT TIRE

(71) Applicant: BRIDGESTONE CORPORATION, Tokyo (JP)

(72) Inventors: Tomoyuki Muramatsu, Tokyo (JP); Toshihiko Iwasaki, Tokyo (JP)

(73) Assignee: BRIDGESTONE CORPORATION, Tokyo (JP)

( * ) Notice: Subject to any disclaimer, the term of this patent is extended or adjusted under 35 U.S.C. 154(b) by 175 days.

(21) Appl. No.: 17/800,159

(22) PCT Filed: Feb. 16, 2021

(86) PCT No.: PCT/JP2021/005635
§ 371 (c)(1),
(2) Date: Aug. 16, 2022

(87) PCT Pub. No.: WO2021/166884
PCT Pub. Date: Aug. 26, 2021

(65) Prior Publication Data
US 2023/0074848 A1    Mar. 9, 2023

(30) Foreign Application Priority Data
Feb. 18, 2020    (JP) ................................. 2020-025386

(51) Int. Cl.
*B60C 19/00* (2006.01)
*G06K 19/077* (2006.01)
*H01Q 1/22* (2006.01)

(52) U.S. Cl.
CPC ............ *B60C 19/00* (2013.01); *B60C 19/003* (2013.01); *G06K 19/07764* (2013.01);
(Continued)

(58) Field of Classification Search
None
See application file for complete search history.

(56) References Cited

U.S. PATENT DOCUMENTS

2005/0076992 A1    4/2005  Metcalf et al.
2005/0275518 A1*  12/2005  Adamson ............ B60C 23/0452
(Continued)

FOREIGN PATENT DOCUMENTS

EP    1 674 301 A2 *  6/2006
EP    1 688 276 A2    8/2006
(Continued)

OTHER PUBLICATIONS

English machine translation of WO 2020/246083 A1, Dec. 10, 2020.*
(Continued)

*Primary Examiner* — Adrienne C. Johnstone
(74) *Attorney, Agent, or Firm* — Sughrue Mion, PLLC

(57) ABSTRACT

An aircraft tire has a pair of bead sections, sidewall sections extending from outer side in a radial direction of the bead sections, and a tread section extending between the sidewall sections; the aircraft tire includes an RFID tag having a tag main body (IC chip) configured to store an information about the aircraft tire and an antenna extended from the tag main body, wherein, when a diameter size of the aircraft tire is 15 inches or less, in a tread surface view, the antenna is disposed such that the antenna is parallel to a tire circumferential direction or intersects the tire circumferential direction within a predetermined angle range, and a belt part disposed in the tread section is made of non-metal material.

3 Claims, 4 Drawing Sheets

(52) U.S. Cl.
CPC ..... *H01Q 1/2241* (2013.01); *B60C 2019/004* (2013.01); *B60C 2200/02* (2013.01)

(56) References Cited

U.S. PATENT DOCUMENTS

| | | | |
|---|---|---|---|
| 2008/0055060 A1 | 3/2008 | Logan | |
| 2011/0226401 A1 | 9/2011 | Battocchio et al. | |
| 2017/0355236 A1* | 12/2017 | Wei | B60C 23/0493 |
| 2023/0078891 A1* | 3/2023 | Muramatsu | G06K 19/07764 |

FOREIGN PATENT DOCUMENTS

| | | |
|---|---|---|
| EP | 2 039 536 A1 | 3/2009 |
| JP | 2006-335031 A | 12/2006 |
| JP | 2008-049999 A | 3/2008 |
| JP | 2010-269670 A | 12/2010 |
| JP | 2010-285023 A | 12/2010 |
| JP | 2017-132291 A | 8/2017 |
| WO | WO-00/47430 A1 * | 8/2000 |
| WO | 2004/074016 A1 | 9/2004 |
| WO | WO-2020/246083 A1 * | 12/2020 |

OTHER PUBLICATIONS

International Search Report for PCT/JP2021/005635 dated Apr. 6, 2021 [PCT/ISA/210].
Extended European Search Report dated Jul. 3, 2023 in Application No. 21757990.3.

* cited by examiner

Comparative

AIRCRAFT TIRE

CROSS REFERENCE TO RELATED APPLICATIONS

This application is a National Stage of International Application No. PCT/JP2021/005635 filed Feb. 16, 2021, claiming priority based on Japanese Patent Application No. 2020-025386 filed Feb. 18, 2020.

TECHNICAL FIELD

The present invention relates to an aircraft tire mainly used for an airliner or the like.

RELATED ART

Contactless RFID (Radio Frequency Identification) tags configured to write and read information using electromagnetic waves are widely used.

An aircraft tire is managed by attaching the RFID tag to the aircraft tire, and writing and reading Information related to the tire.

For example, Patent Literature 1 discloses a structure of an aircraft tire in which the RFID tag is embedded in a crown region thereof and a dipole antenna is disposed in an axial direction.

CITATION LIST

Patent Literature

Patent Literature 1: U.S. Patent Application Publication No. 2011/0226401

SUMMARY OF INVENTION

However, in the above-described conventional aircraft tire, when a size (diameter) of the tire is small, for example, 15 inches or less, a length of the antenna in the RFID tag to be disposed in the axial direction is restricted due to a narrow tire width. Therefore, there is a problem that the communication performance with the RFID reader/writer deteriorates.

An object of the present invention is to provide an aircraft tire that improves RIFD tag communication performance even when a size is 15 inches or smaller.

One or more embodiments of an aircraft tire (T) according to present invention has a pair of bead sections (100), sidewall sections (104) extending from outer side in a radial direction of the bead sections, and a tread section (106) extending between the sidewall sections; the aircraft tire includes an RFID tag (10) having a tag main body (11) configured to store an information about the aircraft tire and an antenna (A1, A2) extended from the tag main body; wherein, when a diameter size of the aircraft tire is 15 inches or less, in a tread surface view, the antenna is disposed such that the antenna is parallel to a tire circumferential direction or intersects the tire circumferential direction within a predetermined angle range, and a belt part disposed in the tread section is made of non-metal material.

According to such a configuration, even when the diameter is 15 inches or less, an RFID tag having an antenna with a sufficient length can be disposed without being restricted by the tire width and the communication performance of the tire improves.

Further, since the belt part disposed in the tread section is made of a non-metal material, attenuation of electromagnetic waves or the like between the RFID tag and the RFID reader/writer reduces, and the communication performance of the tire improves.

According to the present invention, it is possible to provide an aircraft tire with improved communication performance of an RFID tag even when the size is 15 inches or less.

BRIEF DESCRIPTION OF DRAWINGS

FIG. 5 at (b) is a schematic configuration diagram illustrating other configuration examples of RFID tags to be applied to the aircraft tire according to some embodiments.

DESCRIPTION OF EMBODIMENTS

An aircraft tire T according to an embodiment of one or more embodiments will be described with reference to FIGS. 1 to 7.

In the following drawings, the same or similar parts are denoted by the same or similar numerals. However, it should be noted that the drawings are schematic, and the ratio of each dimension and the like may be different from the actual figures.

Therefore, specific dimensions should be determined in consideration of the following description. Further, it is needless to say that portions having different dimensional relationships and ratios among the drawings are included.

(Configuration Example of Aircraft Tire T)

An example of a configuration of an aircraft tire T will be described with reference to FIGS. 1 and 2.

Figure 1:
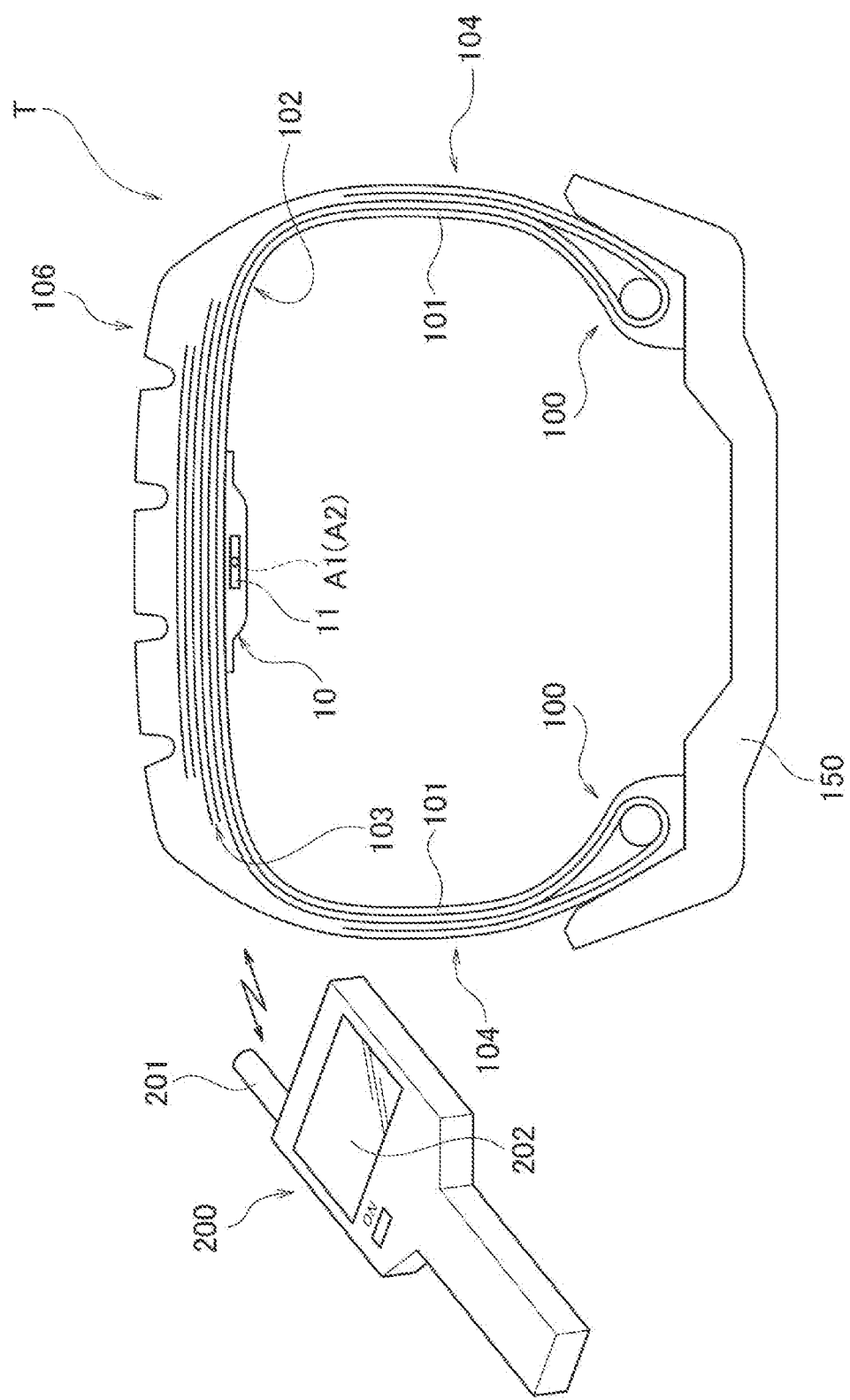
FIG. 1 is a cross-sectional view in a tread width direction illustrating a schematic configuration of an aircraft tire according to one or more embodiments.
Figure 2:
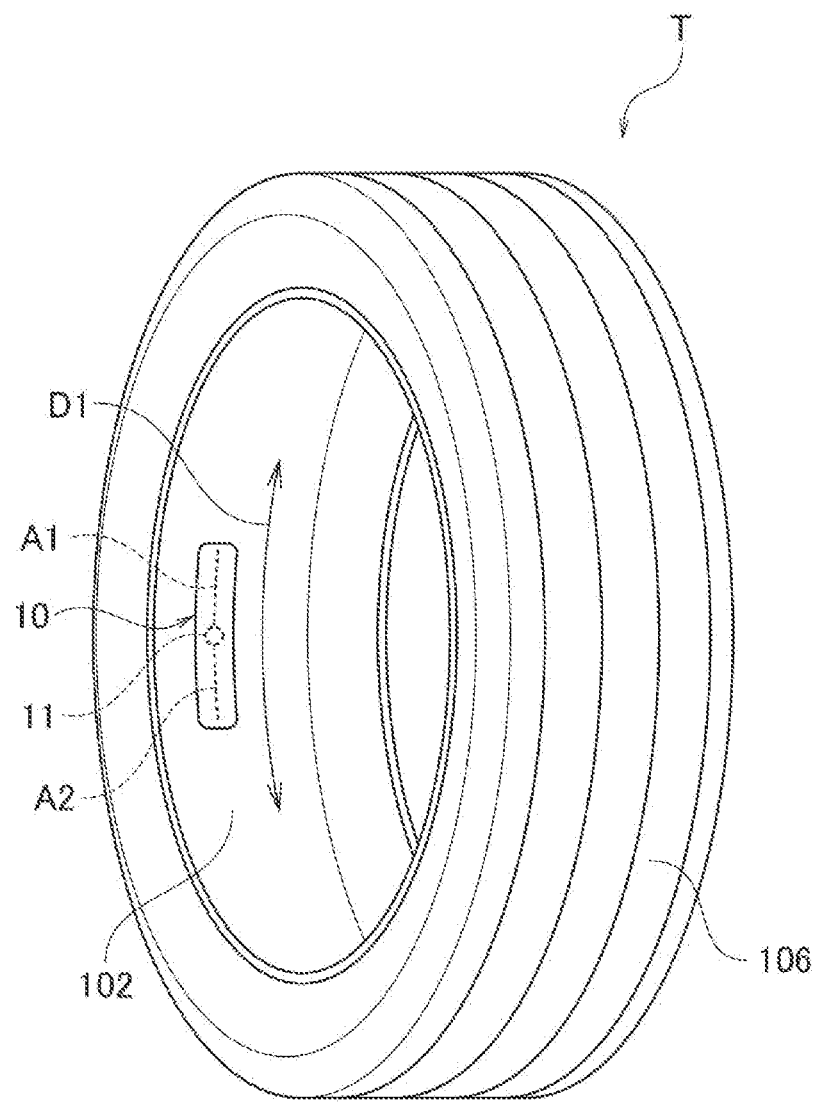
FIG. 2 is a perspective view illustrating a schematic configuration of the aircraft tire according to the one or more embodiments.

FIG. 1 is a cross-sectional view in a tread width direction illustrating a schematic configuration of the aircraft tire T according to one or more embodiments; and FIG. 2 is a perspective view illustrating a schematic configuration of the aircraft tire T.

The aircraft tire T includes bead sections 100 to be in contact with wheels 150, a carcass 101 as a frame of the aircraft tire T, a plurality of belt parts 103 disposed on an outer side in a tire radial direction of the carcass 101, and a tread section 106 disposed on an outer side in the tire radial direction of the belt part 103 and configured to be in contact with a road surface. A sidewall section 104 extending from an outer side in a radial direction of a pair of the bead sections 100.

As illustrated in FIG. 1, a tire inner surface 102 of the aircraft tire T according to the present embodiment is provided with an RFID tag 10 including an IC chip 11 as a tag main body configured to store information (information such as serial number, size, and proper internal pressure) about the aircraft tire T and antennas A1 and A2 extended from the IC chip 11.

More specifically, the RFID tag 10 is formed by sealing the IC chip 11 and the antennas A1 and A2 within a rubber patch 12, and is attached to the tire inner surface 102 of the tread section 106 (between the axial boundaries of the tread ground contact width) by an adhesive.

When the diameter of the aircraft tire T is 15 inches or less, the antennas A1 and A2 are disposed such that the antennas A1 and A2 are parallel to a tire circumferential direction or intersect the tire circumferential direction within a predetermined angle range (For example, within 5 degrees) in the tread surface view, m illustrated in FIG. 2.

Further, the belt part 103 disposed in the tread section 106 is made of a non-metal material such as synthetic fiber. As a result, the attenuation or the like of electromagnetic waves between the RFID tag 10 and the RFID reader/writer 200 reduces, thereby improving the communication performance.

A RFID reader/writer 200 illustrated in FIG. 1 is configured to transmit and receive information to and from the RFID tag 10.

The RFID reader/writer 200 includes a communication antenna 201 and an information display part 202 having a liquid crystal display, etc.; and the RFID reader/writer 200 is configured to display and review information (information such as serial number, size, and proper internal pressure) about the aircraft tire T read from the RFID tag 10.

With such a configuration, when the diameter of the aircraft tire T is 21 inches or more, the attenuation of electromagnetic waves in the aircraft tire T reduces and improves the communication performance of the RFID tag. Measurement examples for reviewing the communication performance of the aircraft tire T will be described later.

When the balance patch is provided on the tire inner surface 102, the RFID tag 10 is disposed circumferentially apart from the balance patch. Thus, the RFID tag 10 can be provided in a state that the balance of the tire T for the aircraft be maintained.

Further, by attaching the RFID tag 10 to the tire inner surface 102, the head section 100 can function as an antenna, and the communication performance is further improved. Moreover, the sensitivity of the RFID tag 10 is enhanced by the reflection of the electromagnetic wave at the bead section 100.

(Configuration Example of RFID Tag)

Figure 3:
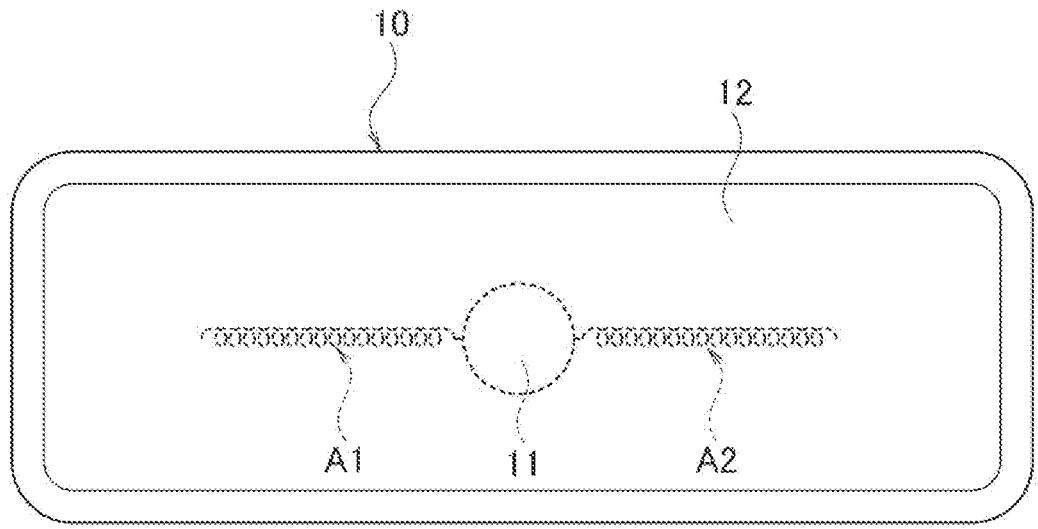
FIG. 3 is a schematic configuration diagram illustrating a configuration example of an RFID tag to be applied to the aircraft tire according to the one or more embodiments.
Figure 4:
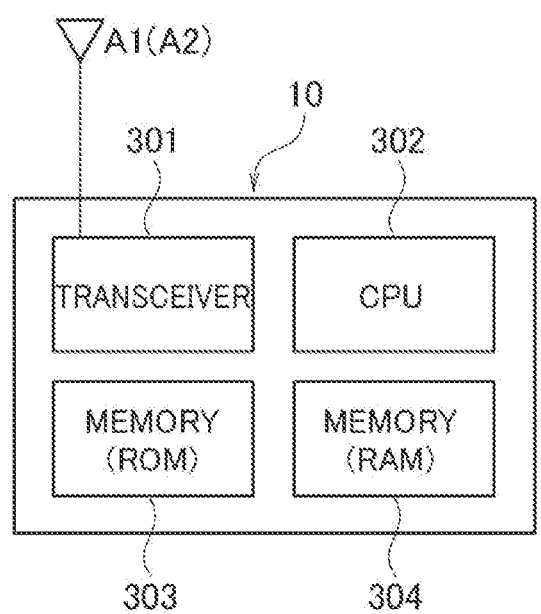
FIG. 4 is a block diagram illustrating an internal configuration of the RFID tag to be applied to the aircraft tire according to the one or more embodiments.

Referring to FIGS. 3 and 4, a configuration example of the RFID tag 10 applicable to the aircraft tire T according to the present embodiment will be described.

FIG. 3 is a schematic configuration diagram illustrating a configuration example of an RFID tag 10 to be applied to the aircraft tire T according to the present embodiment; and FIG. 4 is a block diagram illustrating an internal configuration of the RFID tag 10.

As illustrated in FIG. 3, the RFID tag 10 is formed by sealing the IC chip 11 and the antennas A1 and A2 within the rubber patch 12. An adhesive layer is provided on a back surface of the rubber patch 12 so as to be attached to the tire inner surface 102.

As illustrated in FIG. 4, the RFID tag 10 includes the antennas A1, A2, a transmitter/receiver (transceiver) 301 including an RF circuit and a power supply circuit, a CPU 302 as a controller, a memory 303 including a nonvolatile memory ROM, and a memory 304 including a volatile memory (RAM).

The antennas A3 and A2 communicate with the RFID reader/writer 200 and the like. The antennas A1 and A2 also serve as power receiving devices configured to feed electrical power to the transmitter/receiver 301 or the like depending on radio signals from the RFID reader/writer 200 or the like.

The transmitter/receiver 301 modulates/demodulates data transmitted/received by the RF circuit, and feeds electrical power to the CPU 302 or the like by the power supply circuit.

In accordance with the command received from the antennas A1 and A2, the CPU 302 performs processing such as responding to data (Serial number, size, proper internal pressure, etc.) about the aircraft tire T or a unique ID recorded in the memory 303.

The memory 304 is used as a work area of the CPU 302.

(Antenna Configuration Example)

Figure 5A:
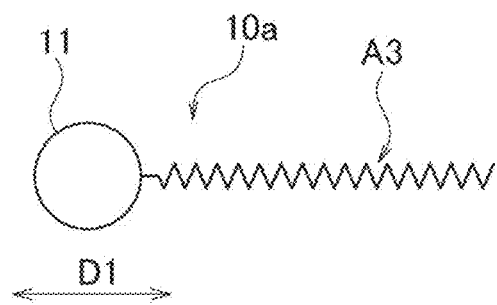
FIG. 5 at (a) is a schematic configuration diagram illustrating other configuration examples of RFID tags to be applied to the aircraft tire according to some embodiments.
Figure 5B:
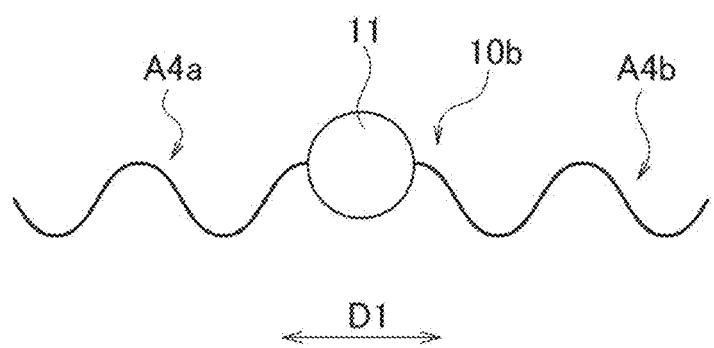

Referring to FIGS. 3 and 5, a configuration example of the antenna in the RFID tag 10 wilt be described.

Antennas A1 and A2 illustrated in FIG. 3 are formed to be a so-called dipole antenna in which antenna lines having linear shape and same length extends from right and left ends of the IC chip 11. The antenna wire may be formed of a coil winding.

The antenna A3 of the RFID tag 10*a* illustrated in FIG. 5 at (a) is a so-called monopole antenna in which an antenna line having a linear shape and having a length extends from a right end of the IC chip 11. The antenna wire may be formed of a coil winding.

The antennas A4*a* and A4*b* illustrated in FIG. 5 at (b) are formed to be a so-called dipole antenna in which antenna lines having wavy-line shape extends from the left and right ends of the IC chip 11.

The distances from the end of the IC chip 11 to the ends of the antennas A4*a* and A4*b* are made the same.

(Measurement Examples of Communication Distance)

Measurement examples of communication distance of the RFID tags 10 will be described with reference to FIGS. 6 and 7.

Figure 6:
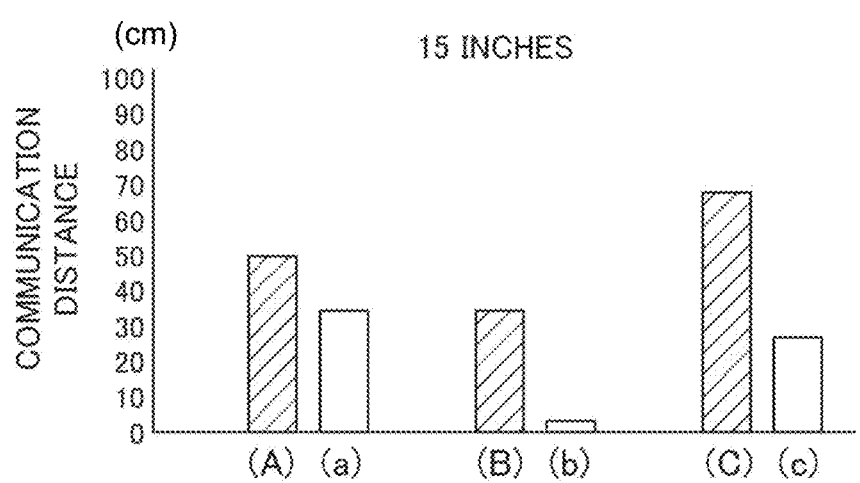
FIG. 6 is a graph depicting communication distances of experimental RFID tags (A) to (C) or the like for the aircraft tire (15 inches) according to the embodiments.
Figure 7:
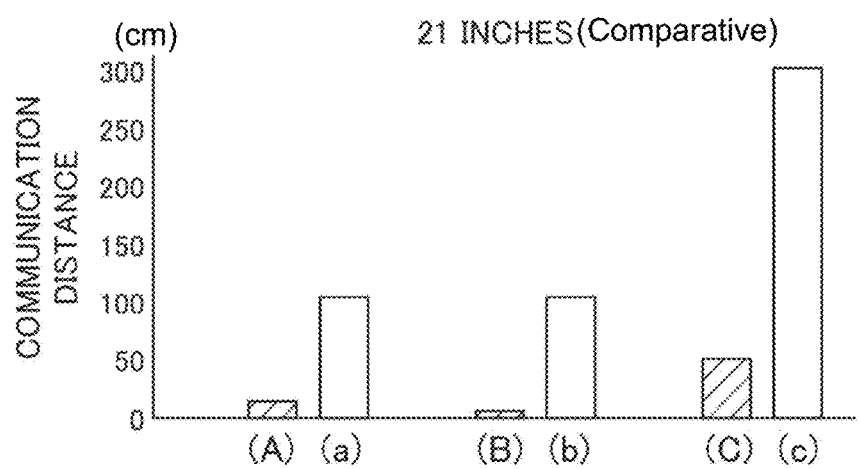
FIG. 7 is a graph depicting communication distances of experimental RFID tags (A) to (C) or the like for an aircraft tire (21 inches) according to comparative examples.

FIG. 6 is a graph depicting communication distances of experimental RFID tags (A) to (C) or the like for art aircraft tire T (15 inches) according to the present embodiment; and FIG. 7 is a graph depicting communication distances of experimental RFID tags (A) to (C) or she like for the aircraft tire (21 inches) according to a comparative example.

For measurements, three experimental RFID tags (A) to (C) with different lengths of the antennas (antenna width) A1 and A2 are prepared as the RFID tag 10 having a dipole antenna illustrated in FIG. 3.

Here, a length of antennas (antenna width) of the experimental RFID tag (A) is 60 mm, a length of the antenna (antenna width) of the experimental RFID tag (B) is 70 mm, and a length of antenna (antenna width) of the experimental RFID tag (C) is 50 mm.

An aircraft tire (21 inches) as a comparative example and the aircraft tire (15 inches) are prepared, and the RFID tags (A) to (C) are attached to the tire inner surface 102 as illustrated in FIG. 2 such that the antennas A1 and A2 are parallel to the lire circumferential direction D1 or intersect the tire circumferential direction D1 within a predetermined angle range (For example, within 5 degrees), and the communication distance readable by the RFID reader/writer 200 are measured.

With the aircraft tire (15 inches), the communication distance of the experimental RFID tag (A) is approximately 5.1 cm, the communication distance of the experimental RFID tag (B) is approximately 35 cm, and the communication distance of the experimental RFID tag (C) is approximately 69 cm.

By contrast, with the aircraft tire (21 inches), the communication distance of the experimental RFID tag (A) is approximately 17 cm, the communication distance of the experimental RFID tag (B) is approximately 10 cm, and the communication distance of the experimental RFID tag (C) is approximately 55 cm.

Note that items (a) to (c) in FIGS. 6 and 7 depict communication distances that are measured in the aircraft tire when the experimental RFID tags (A) to (C) are provided along a width direction of the aircraft tire as a reference.

According to these graphs, in the case of the aircraft tire (15 inches), the communication distance tends to ire longer when the experimental RFID tags (A) to (C) are provided along the circumferential direction than when the experimental RFID tags (A) to (C) are provided along the width direction.

By contrast, in the case of the aircraft tire (21 inches), the communication distance tends to be longer than when RFID tags (A) to (C) are provided along the circumferential direction than when the experimental RFID tags (A) to (C) are provided along the circumferential direction.

As described above, when the experimental RFID tags (A) to (C) are attached to the inner surface 102 such that the antennas A1 and A2 are parallel to the tire circumferential direction D1 or intersect the tire circumferential direction D1 within a predetermined angle range (For example, within 5 degrees), the aircraft tire (15 inches) having relatively small diameter has a longer communication distance than the aircraft tire (21 inches) having a relatively large diameter.

(Action/Effect)

According to the above-described embodiment, the following effects are obtained.

That is, the aircraft tire T according to the present embodiment includes an RFID tag 10 having an IC chip 11 configured to store information about the aircraft tire and antennas A1 and A2 extended front the IC chip 11; and the antennas A1 and A2 are disposed such that the antennas A1 and A2 are parallel to the tire circumferential direction D1 or intersects the tire circumferential direction within a predetermined angle range, when the diameter is 15 inches or less, an RFID tag 10 having an antenna with a sufficient length can be disposed without being restricted by the tire width, and the communication performance of she tire improves.

Further, since the belt part 103 disposed in the tread section 106 is made of a non-metal material, attenuation of electromagnetic waves or the like between the RFID tag 10 and the RFID reader/writer 200 reduces, and the communication performance of the tire improves.

Since the antenna can be configured of a monopole antenna or a dipole antenna exhibiting a linear shape or wavy line shape, various types of RFID tags can be employed.

Since the RFID tag 10 can be attached to the fire inner surface 102, it can be brought close to the bead section 100, and communication property may be further improved by functioning the bead section 100 as an antenna. Further, the sensitivity of the RFID tag 10 can be enhanced by the reflection of the electromagnetic wave by the bead section 100.

Since the RFID tag 10 may be disposed to be circumferentially apart from the balance patch provided on the tire inner surface, the RFID tag 10 may be provided in a state where the balance of the aircraft tire T is maintained.

Although the aircraft tire of the present in invention has been described above based on the illustrated embodiment, the preset invention is not limited thereto, and the configuration of each part can be replaced with any configuration having a similar function.

REFERENCE SIGNS LIST

T AIRCRAFT TIRE
A1, A2, A3, A4a, A4b ANTENNA
D1 EXTENSION DIRECTION
10 REID TAG
11 TAG MAIN BODY (IC CHIP)
100 BEAD SECTION
102 TIRE SURFACE
104 SIDEWALL SECTION
106 TREAD SECTION

The invention claimed is:

1. An aircraft tire having a pair of bead sections, sidewall sections extending from outer side in a radial direction of the bead sections, and a tread section extending between the sidewall sections, the aircraft tire comprising:
    a radio frequency identification (RFID) tag that is attached to a tire inner surface of the tread section and includes a tag main body configured to store an information about the aircraft tire and an antenna extended from the tag main body, wherein
    a diameter of the aircraft tire is 15 inches or less,
    the tag main body and the antenna of the RFID tag is sealed within a rubber patch and the rubber patch is attached to the tire inner surface of the tread section by an adhesive,
    the antenna is a monopole antenna or a dipole antenna,
    the antenna is disposed such that the antenna is parallel to a tire circumferential direction or intersects the tire circumferential direction within 5 degrees in a tread surface view, and
    a belt part disposed in the tread section is made of non-metal material.

2. The aircraft tire according to claim 1, wherein the monopole antenna or the dipole antenna has a linear shape or wavy line shape.

3. The aircraft tire according to claim 1, wherein the RFID tag is disposed circumferentially apart from a balance patch provided on the tire inner surface.

* * * * *